United States Patent
Tang et al.

(10) Patent No.: US 10,129,833 B2
(45) Date of Patent: Nov. 13, 2018

(54) POWER CONTROL METHOD, APPARATUS, AND SYSTEM

(71) Applicant: Huawei Technologies Co., Ltd., Shenzhen (CN)

(72) Inventors: Xin Tang, Shanghai (CN); Xiaoqing Liu, Shanghai (CN); Yuejun Wei, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 128 days.

(21) Appl. No.: 14/982,607

(22) Filed: Dec. 29, 2015

(65) Prior Publication Data
US 2016/0135129 A1    May 12, 2016

Related U.S. Application Data (63) Continuation of application No. PCT/CN2013/078479, filed on Jun. 29, 2013.

(51) Int. Cl.
| H04W 4/00 | (2018.01) |
| H04W 52/12 | (2009.01) |
| H04W 52/24 | (2009.01) |
| H04W 72/08 | (2009.01) |

(52) U.S. Cl.
CPC ......... *H04W 52/12* (2013.01); *H04W 52/125* (2013.01); *H04W 52/24* (2013.01); *H04W 52/241* (2013.01); *H04W 72/085* (2013.01)

(58) Field of Classification Search
None
See application file for complete search history.

(56) References Cited

U.S. PATENT DOCUMENTS

| 6,807,164 B1 | 10/2004 | Almgren et al. | |
| 2002/0187802 A1 | 12/2002 | Agin et al. | |
| 2003/0021243 A1* | 1/2003 | Hamalainen | H04L 1/0009 |
| | | | 370/329 |
| 2011/0044263 A1* | 2/2011 | El-saidny | H04W 52/12 |
| | | | 370/329 |

FOREIGN PATENT DOCUMENTS

| CN | 1373940 A | 10/2002 |
| CN | 1486100 A | 3/2004 |
| CN | 1691533 A | 11/2005 |
| CN | 101072056 A | 11/2007 |
| CN | 101527957 A | 9/2009 |

(Continued)

OTHER PUBLICATIONS

Zhang, H. et al., "Principles and Techniques of Modern Communication, Chapter 6—Digital Transmission of Analog Signals," 3rd edition, Xi an University of Electronic Science and Technology Press_Feb. 28, 2013, pp. 133-137.

*Primary Examiner* — Zewdu A Beyen
(74) *Attorney, Agent, or Firm* — Slater Matsil, LLP (57) ABSTRACT

A power control method, apparatus, and system is described. First outer loop power control is performed according to an actual hard metric and a preset target hard metric to adjust a target soft metric required by second outer loop power control, to obtain an adjusted target soft metric. Therefore, this ensures that when the adjusted target soft metric is converged, the target hard metric can be correctly converged to achieve target quality required by a system.

16 Claims, 6 Drawing Sheets

(56) References Cited

FOREIGN PATENT DOCUMENTS

| | | |
|---|---|---|
| CN | 102291765 A | 12/2011 |
| EP | 1311076 A1 | 5/2003 |
| EP | 2584711 A1 | 4/2013 |
| EP | 1766830 B1 | 5/2013 |
| JP | 2006174369 A | 6/2006 |
| WO | 0120808 | 3/2001 |

* cited by examiner

POWER CONTROL METHOD, APPARATUS, AND SYSTEM

This application is a continuation of International Application No. PCT/CN2013/078479, filed on Jun. 29, 2013, which is hereby incorporated by reference in its entirety.

TECHNICAL FIELD

Embodiments of the present application relate to communications technologies, and in particular, to a power control method, apparatus, and system.

BACKGROUND

A communications system, for example, Wideband Code Division Multiple Access (WCDMA), is a self-interference system. Service quality of a user may be improved by improving transmit power of the user equipment (UE). However, at the same time, interference to the system may also increase, and therefore, the power needs to be controlled to improve system performance.

In the prior art, a method combining outer loop power control and inner loop power control is used to perform power control. Specifically, in the outer loop power control, a target signal-to-interference ratio (SIR) of the inner loop power control is adjusted according to an actual bit error rate (BER) and a preset target BER. If the actual BER is greater than the target BER, the target SIR of the inner loop power control is increased, and otherwise, the target SIR of the inner loop power control is decreased. In the inner loop power control, inner loop power control is performed according to an actual SIR and an adjusted target SIR that is obtained by means of the outer loop power control, so that the UE increases or reduces the transmit power according to the inner loop power control to improve the system performance.

However, when power control is being performed by using the foregoing prior art, a problem of relatively low power control accuracy often occurs, and target quality required by a system cannot be correctly converged.

SUMMARY

Embodiments of the present application provide a power control method, apparatus, and system, to improve accuracy of power control, and achieve target quality required by a system.

A first aspect of the embodiments of the present application provides a power control method, including acquiring an actual hard metric; and performing first outer loop power control according to the actual hard metric and a preset target hard metric to adjust a target soft metric required by second outer loop power control, to obtain an adjusted target soft metric, where the second outer loop power control adjusts a target SIR according to an actual soft metric and the adjusted target soft metric.

With reference to the first aspect, in a first possible implementation manner, after the performing first outer loop power control according to the actual hard metric and a preset target hard metric to adjust a target soft metric required by second outer loop power control, to obtain an adjusted target soft metric, the method further includes: sending the adjusted target soft metric to a base station, so that the base station performs the second outer loop power control; or performing the second outer loop power control according to the actual soft metric sent by a base station and the adjusted target soft metric, to obtain an adjusted target SIR; and sending the adjusted target SIR to the base station.

With reference to the first aspect or the first possible implementation manner of the first aspect, in a second possible implementation manner, if a magnitude of the target soft metric is inversely proportional to a status of target quality, the performing first outer loop power control according to the actual hard metric and a preset target hard metric to adjust a target soft metric required by second outer loop power control includes: determining, by means of comparison, whether the actual hard metric is greater than the preset target hard metric. If yes, decreasing the target soft metric; or if no, increasing the target soft metric. If a magnitude of the target soft metric is proportional to a status of target quality, the performing first outer loop power control according to the actual hard metric and a preset target hard metric to adjust a target soft metric required by second outer loop power control includes: determining, by means of comparison, whether the actual hard metric is greater than the preset target hard metric; and if yes, increasing the target soft metric; or if no, decreasing the target soft metric.

With reference to the second possible implementation manner, in a third possible implementation manner, the decreasing the target soft metric includes: decreasing the target soft metric by using a first adjustment value; or the increasing the target soft metric includes increasing the target soft metric by using a second adjustment value.

With reference to the first aspect or the first possible implementation manner of the first aspect, in a fourth possible implementation manner, after the obtaining an adjusted target soft metric, the method further includes performing transformation processing on the target soft metric to obtain a target soft metric obtained after transformation processing. Accordingly, the actual soft metric is a soft metric obtained after transformation processing.

With reference to the fourth possible implementation manner, in a fifth possible implementation manner, the transformation processing includes one or a combination of the following processing filtering processing, logarithmic processing, and fuzzy processing.

With reference to the first aspect or any possible implementation manner of the first to the fifth possible implementation manners of the first aspect, in a sixth possible implementation manner, before the performing first outer loop power control according to the actual hard metric and a preset target hard metric to adjust a target soft metric required by second outer loop power control, the method further includes acquiring quality requirement information of power control; and determining, according to the quality requirement information, whether to use one-level outer loop power control or two-level outer loop power control. If it is determined to use two-level outer loop power control, performing the step of the performing first outer loop power control according to the actual hard metric and a preset target hard metric to adjust a target soft metric required by second outer loop power control.

With reference to the first aspect or any possible implementation manner of the first to the sixth possible implementation manners of the first aspect, in a seventh possible implementation manner, the hard metric is a BLER, and/or the soft metric is a BER.

A second aspect of the embodiments of the present application provides a power control method, including acquiring a target SIR, where the target SIR is an adjusted target SIR obtained by performing second outer loop power control according to an actual soft metric and an adjusted target soft metric that is obtained by means of first outer loop power control, and the first outer loop power control adjusts a target soft metric according to an actual hard metric and a preset target hard metric; and performing inner loop power control according to an actual SIR and the adjusted target SIR.

With reference to the second aspect, in a first possible implementation manner, before the acquiring a target SIR, the method further includes sending the actual soft metric to an RNC. The acquiring a target SIR, where the target SIR is an adjusted target SIR obtained by performing second outer loop power control according to an actual soft metric and an adjusted target soft metric that is obtained by means of first outer loop power control includes receiving the target SIR sent by the RNC, where the target SIR is the adjusted target SIR obtained by performing second outer loop power control by the RNC according to the actual soft metric and the adjusted target soft metric that is obtained by means of first outer loop power control.

With reference to the second aspect, in a second possible implementation manner, the acquiring a target SIR, where the target SIR is an adjusted target SIR obtained by performing second outer loop power control according to an actual soft metric and an adjusted target soft metric that is obtained by means of first outer loop power control includes: receiving the target soft metric sent by an RNC, where the target soft metric is the adjusted target soft metric obtained by performing first outer loop power control by the RNC according to the actual hard metric and the preset target hard metric; and performing second outer loop power control according to the actual soft metric and the adjusted target soft metric to obtain the adjusted target SIR.

With reference to the second aspect or either the first or the second possible implementation manner of the second aspect, in a third possible implementation manner, the actual soft metric is an actual soft metric obtained after transformation processing, and the target soft metric is a target soft metric obtained after transformation processing.

With reference to the third possible implementation manner, in a fourth possible implementation manner, the transformation processing includes one or a combination of the following processing: filtering processing, logarithmic processing, and fuzzy processing.

With reference to the second aspect or any possible implementation manner of the first to the fourth possible implementation manners of the second aspect, in a fifth possible implementation manner, the soft metric is a BER.

A third aspect of the embodiments of the present application provides a power control apparatus, including: a first acquiring module configured to acquire an actual hard metric; and a first processing module configured to perform first outer loop power control according to the actual hard metric and a preset target hard metric to adjust a target soft metric required by second outer loop power control, to obtain an adjusted target soft metric, where the second outer loop power control adjusts a target signal-to-interference ratio SIR according to an actual soft metric and the adjusted target soft metric.

With reference to the third aspect, in a first possible implementation manner, the first processing module is further configured to: after performing first outer loop power control according to the actual hard metric and the preset target hard metric to adjust the target soft metric required by second outer loop power control, to obtain the adjusted target soft metric, send the adjusted target soft metric to a base station, so that the base station performs the second outer loop power control; or perform the second outer loop power control according to the actual soft metric sent by a base station and the adjusted target soft metric, to obtain an adjusted target SIR; and send the adjusted target SIR to the base station.

With reference to the third aspect or the first possible implementation manner of the third aspect, in a second possible implementation manner, if a magnitude of the target soft metric is inversely proportional to a status of target quality, the first processing module is specifically configured to: determine, by means of comparison, whether the actual hard metric is greater than the preset target hard metric; and if yes, decrease the target soft metric; or if no, increase the target soft metric. Alternatively, if a magnitude of the target soft metric is proportional to a status of target quality, the first processing module is specifically configured to: determine, by means of comparison, whether the actual hard metric is greater than the preset target hard metric; and if yes, increase the target soft metric; or if no, decrease the target soft metric.

With reference to the second possible implementation manner, in a third possible implementation manner, the first processing module is specifically configured to decrease the target soft metric by using a first adjustment value; or the first processing module is specifically configured to increase the target soft metric by using a second adjustment value.

With reference to the third aspect or the first possible implementation manner of the third aspect, in a fourth possible implementation manner, the first processing module is further configured to: after obtaining the adjusted target soft metric, perform transformation processing on the target soft metric to obtain a target soft metric obtained after transformation processing, where: accordingly, the actual soft metric is a soft metric obtained after transformation processing.

With reference to the fourth possible implementation manner, in a fifth possible implementation manner, the transformation processing includes one or a combination of the following processing: filtering processing, logarithmic processing, and fuzzy processing.

With reference to the third aspect or any possible implementation manner of the first to the fifth possible implementation manners of the third aspect, in a sixth possible implementation manner, the first processing module is further configured to: before performing first outer loop power control according to the actual hard metric and the preset target hard metric to adjust the target soft metric required by second outer loop power control, acquire quality requirement information of power control; determine, according to the quality requirement information, whether to use one-level outer loop power control or two-level outer loop power control; and if it is determined to use two-level outer loop power control, perform the step of the performing first outer loop power control according to the actual hard metric and a preset target hard metric to adjust a target soft metric required by second outer loop power control.

With reference to the third aspect or any possible implementation manner of the first to the sixth possible implementation manners of the third aspect, in a seventh possible implementation manner, the hard metric is a BLER, and/or the soft metric is a BER.

A fourth aspect of the embodiments of the present application provides a power control apparatus, including a second acquiring module, configured to acquire a target SIR, where the target SIR is an adjusted target SIR obtained by performing second outer loop power control according to an actual soft metric and an adjusted target soft metric that is obtained by means of first outer loop power control, and the first outer loop power control adjusts a target soft metric according to an actual hard metric and a preset target hard metric; and a second processing module, configured to perform inner loop power control according to an actual SIR and the adjusted target SIR.

With reference to the fourth aspect, in a first possible implementation manner, the apparatus further includes: a sending module, configured to: before the target SIR is acquired, send the actual soft metric to an RNC; and the second acquiring module is specifically configured to receive the target SIR sent by the RNC, where the target SIR is the adjusted target SIR obtained by performing second outer loop power control by the RNC according to the actual soft metric and the adjusted target soft metric that is obtained by means of first outer loop power control.

With reference to the fourth aspect, in a second possible implementation manner, the second acquiring module is specifically configured to: receive the target soft metric sent by an RNC, where the target soft metric is the adjusted target soft metric obtained by performing first outer loop power control by the RNC according to the actual hard metric and the preset target hard metric; and perform second outer loop power control according to the actual soft metric and the adjusted target soft metric to obtain the adjusted target SIR.

With reference to the fourth aspect or either the first or the second possible implementation manner of the fourth aspect, in a third possible implementation manner, the actual soft metric is an actual soft metric obtained after transformation processing, and the target soft metric is a target soft metric obtained after transformation processing.

With reference to the third possible implementation manner, in a fourth possible implementation manner, the transformation processing includes one or a combination of the following processing: filtering processing, logarithmic processing, and fuzzy processing.

With reference to the fourth aspect or any possible implementation manner of the first to the fourth possible implementation manners of the fourth aspect, in a fifth possible implementation manner, the soft metric is a BER.

A fifth aspect of the embodiments of the present application provides a power control apparatus, including: a first acquirer, configured to acquire an actual hard metric; and a first processor, configured to perform first outer loop power control according to the actual hard metric and a preset target hard metric to adjust a target soft metric required by second outer loop power control, to obtain an adjusted target soft metric, where the second outer loop power control adjusts a target SIR according to an actual soft metric and the adjusted target soft metric.

With reference to the fifth aspect, in a first possible implementation manner, the first processor is further configured to: after performing first outer loop power control according to the actual hard metric and the preset target hard metric to adjust the target soft metric required by second outer loop power control, to obtain the adjusted target soft metric, send the adjusted target soft metric to a base station, so that the base station performs the second outer loop power control; or perform the second outer loop power control according to the actual soft metric sent by a base station and the adjusted target soft metric, to obtain an adjusted target SIR; and send the adjusted target SIR to the base station.

With reference to the fifth aspect or the first possible implementation manner of the fifth aspect, in a second possible implementation manner, if a magnitude of the target soft metric is inversely proportional to a status of target quality, the first processor is specifically configured to: determine, by means of comparison, whether the actual hard metric is greater than the preset target hard metric; and if yes, decrease the target soft metric; or if no, increase the target soft metric; or if a magnitude of the target soft metric is proportional to a status of target quality, the first processor is specifically configured to: determine, by means of comparison, whether the actual hard metric is greater than the preset target hard metric; and if yes, increase the target soft metric; or if no, decrease the target soft metric.

With reference to the second possible implementation manner, in a third possible implementation manner, the first processor is specifically configured to decrease the target soft metric by using a first adjustment value; or the first processor is specifically configured to increase the target soft metric by using a second adjustment value.

With reference to the fifth aspect or the first possible implementation manner of the fifth aspect, in a fourth possible implementation manner, the first processor is further configured to: after obtaining the adjusted target soft metric, perform transformation processing on the target soft metric to obtain a target soft metric obtained after transformation processing, where: accordingly, the actual soft metric is a soft metric obtained after transformation processing.

With reference to the fourth possible implementation manner, in a fifth possible implementation manner, the transformation processing includes one or a combination of the following processing: filtering processing, logarithmic processing, and fuzzy processing.

With reference to the fifth aspect or any possible implementation manner of the first to the fifth possible implementation manners of the fifth aspect, in a sixth possible implementation manner, the first processor is further configured to: before performing first outer loop power control according to the actual hard metric and the preset target hard metric to adjust the target soft metric required by second outer loop power control, acquire quality requirement information of power control; determine, according to the quality requirement information, whether to use one-level outer loop power control or two-level outer loop power control; and if it is determined to use two-level outer loop power control, perform the step of the performing first outer loop power control according to the actual hard metric and a preset target hard metric to adjust a target soft metric required by second outer loop power control.

With reference to the fifth aspect or any possible implementation manner of the first to the sixth possible implementation manners of the fifth aspect, in a seventh possible implementation manner, the hard metric is a BLER, and/or the soft metric is a BER.

A sixth aspect of the embodiments of the present application provides a power control apparatus, including: a second acquirer, configured to acquire a target SIR, where the target SIR is an adjusted target SIR obtained by performing second outer loop power control according to an actual soft metric and an adjusted target soft metric that is obtained by means of first outer loop power control, and the first outer loop power control adjusts a target soft metric according to an actual hard metric and a preset target hard metric; and a second processor, configured to perform inner loop power control according to an actual SIR and the adjusted target SIR.

With reference to the sixth aspect, in a first possible implementation manner, the apparatus further includes: a transmitter, configured to: before the target SIR is acquired, send the actual soft metric to an RNC; and the second acquirer is specifically configured to receive the target SIR sent by the RNC, where the target SIR is the adjusted target SIR obtained by performing second outer loop power control by the RNC according to the actual soft metric and the adjusted target soft metric that is obtained by means of first outer loop power control.

With reference to the sixth aspect, in a second possible implementation manner, the second acquirer is specifically configured to: receive the target soft metric sent by an RNC, where the target soft metric is the adjusted target soft metric obtained by performing first outer loop power control by the RNC according to the actual hard metric and the preset target hard metric; and perform second outer loop power control according to the actual soft metric and the adjusted target soft metric to obtain the adjusted target SIR.

With reference to the sixth aspect or either the first or the second possible implementation manner of the sixth aspect, in a third possible implementation manner, the actual soft metric is an actual soft metric obtained after transformation processing, and the target soft metric is a target soft metric obtained after transformation processing.

With reference to the third possible implementation manner, in a fourth possible implementation manner, the transformation processing includes one or a combination of the following processing: filtering processing, logarithmic processing, and fuzzy processing.

With reference to the sixth aspect or any possible implementation manner of the first to the fourth possible implementation manners of the sixth aspect, in a fifth possible implementation manner, the soft metric is a bit error rate BER.

A seventh aspect of the embodiments of the present application provides a power control system, including any first power control apparatus according to the third aspect and any second power control apparatus according to the fourth aspect, where the power control apparatuses are wirelessly connected to each other.

In the power control method, apparatus, and system according to the embodiments of the present application, first outer loop power control is performed according to an actual hard metric and a preset target hard metric to adjust a target soft metric required by second outer loop power control, to obtain an adjusted target soft metric. Therefore, this ensures that mapping between the adjusted target soft metric and the preset target hard metric is more accurate, that is, this ensures that when the adjusted target soft metric is converged, the target hard metric can be correctly converged to achieve target quality required by a system.

BRIEF DESCRIPTION OF THE DRAWINGS

To describe the technical solutions in the embodiments of the present application more clearly, the following briefly introduces the accompanying drawings required for describing the embodiments or the prior art. Apparently, the accompanying drawings in the following description show some embodiments of the present application, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

In self-interference systems such as a WCDMA system, a Time Division-Synchronous Code Division Multiple Access (TD-SCDMA) system and a Long Term Evolution (LTE) system, a two-loop power control method combining outer loop power control based on a target soft metric and inner loop power control is generally used to perform power control, to improve system performance. However, in a modern network communications system, a hard metric is used to measure network system performance, for example, a target block error rate (BLER) is used to represent the network system performance, and a smaller target BLER indicates better network system performance. However, due to different fading of channels and different moving speeds of UEs, a problem is caused that power control based on a target soft metric cannot ensure that required target quality can be correctly converged for the system performance. In the embodiments of the present application, to overcome the foregoing problem, when power control is being performed by using the two-loop power control method combining outer loop power control based on a target soft metric and inner loop power control, outer loop power control is added in which the target soft metric is adjusted by a radio network controller (RNC) according to an actual hard metric and a preset target hard metric, so that the target hard metric can be correctly converged for the system performance, to achieve the target quality required by the system.

Figure 1:
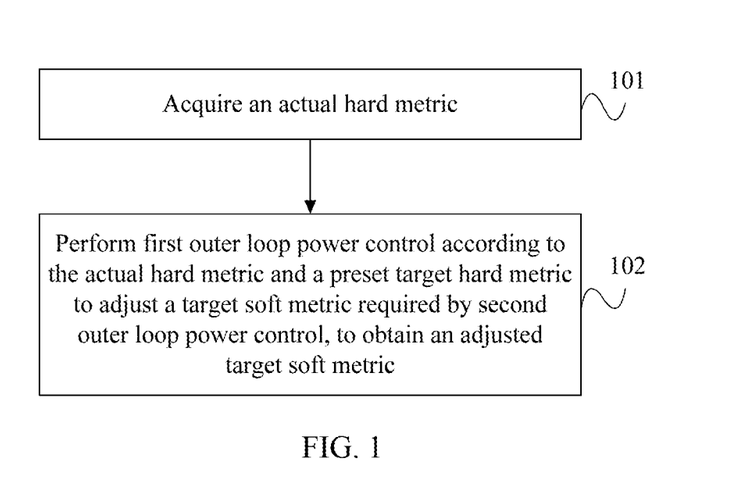
FIG. 1 is a schematic flowchart of Embodiment 1 of a power control method according to the present application.

FIG. 1 is a schematic flowchart of Embodiment 1 of a power control method according to the present application. This embodiment is executed by an RNC, and the method in this embodiment includes:

S101: Acquire an actual hard metric.

S102: Perform first outer loop power control according to the actual hard metric and a preset target hard metric to adjust a target soft metric required by second outer loop power control, to obtain an adjusted target soft metric.

Specifically, the preset target hard metric is target quality required by a system, the target hard metric is generally controlled by the RNC and is generally indicated by using a target BLER. Accordingly, the actual hard metric is an actual BLER. A soft metric may be a bit error rate (BER), soft information of a Viterbi decoder, soft information of a Turbo decoder, a signal-to-noise ratio of received information, an Euclidean distance between received information and coding information, or the like. A BER is generally used as a soft metric, and accordingly, an actual soft metric is an actual BER, and the target soft metric is a target BER.

The second outer loop power control adjusts a target SIR according to the actual soft metric and the adjusted target soft metric.

In this embodiment, first outer loop power control is performed according to an actual hard metric and a preset target hard metric to adjust a target soft metric required by second outer loop power control, to obtain an adjusted target soft metric. Therefore, this ensures that mapping between the adjusted target soft metric and the preset target hard metric is more accurate, that is, this ensures that when the adjusted target soft metric is converged, the target hard metric can be correctly converged to achieve target quality required by a system.

Figure 2:
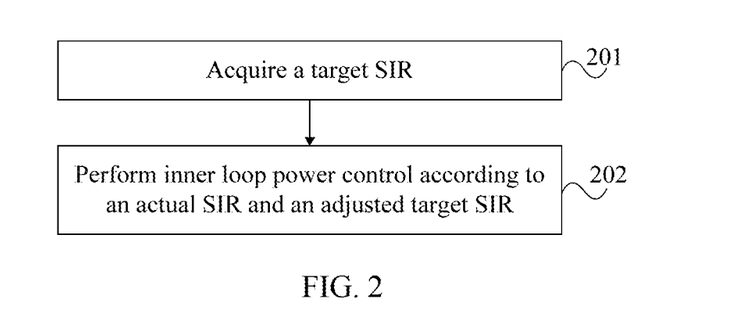
FIG. 2 is a schematic flowchart of Embodiment 2 of a power control method according to the present application.

FIG. 2 is a schematic flowchart of Embodiment 2 of a power control method according to the present application. This embodiment is executed by a base station, and as shown in FIG. 2, the method in this embodiment includes:

S201: Acquire a target SIR.

Specifically, the target SIR is an adjusted target SIR obtained by performing second outer loop power control according to an actual soft metric and an adjusted target soft metric that is obtained by means of first outer loop power control.

The first outer loop power control adjusts a target soft metric according to an actual hard metric and a preset target hard metric.

S202: Perform inner loop power control according to an actual SIR and an adjusted target SIR.

Specifically, the inner loop power control performs transmit power control on a UE according to the actual SIR and the adjusted target SIR. When the actual SIR is greater than the adjusted target SIR, power control indication information for reducing transmit power is sent to the UE, so that the UE reduces transmit power to reduce interference to a system. When the actual SIR is less than or equal to the adjusted target SIR, power control indication information for increasing transmit power is sent to the UE, so that the UE increases transmit power to improve quality of a received signal.

In this embodiment, a target SIR is acquired and inner loop power control is performed according to an actual SIR and an adjusted target SIR. Because the target SIR is the adjusted target SIR obtained by performing second outer loop power control according to an actual soft metric and an adjusted target soft metric that is obtained by means of first outer loop power control, and the first outer loop power control adjusts a target soft metric according to an actual hard metric and a preset target hard metric, that is, the adjusted target soft metric is obtained by means of adjustment according to the actual hard metric and the preset target hard metric, this may ensure that when the adjusted target soft metric is being converged, the target hard metric can be correctly converged to achieve target quality required by a system.

Figure 3:
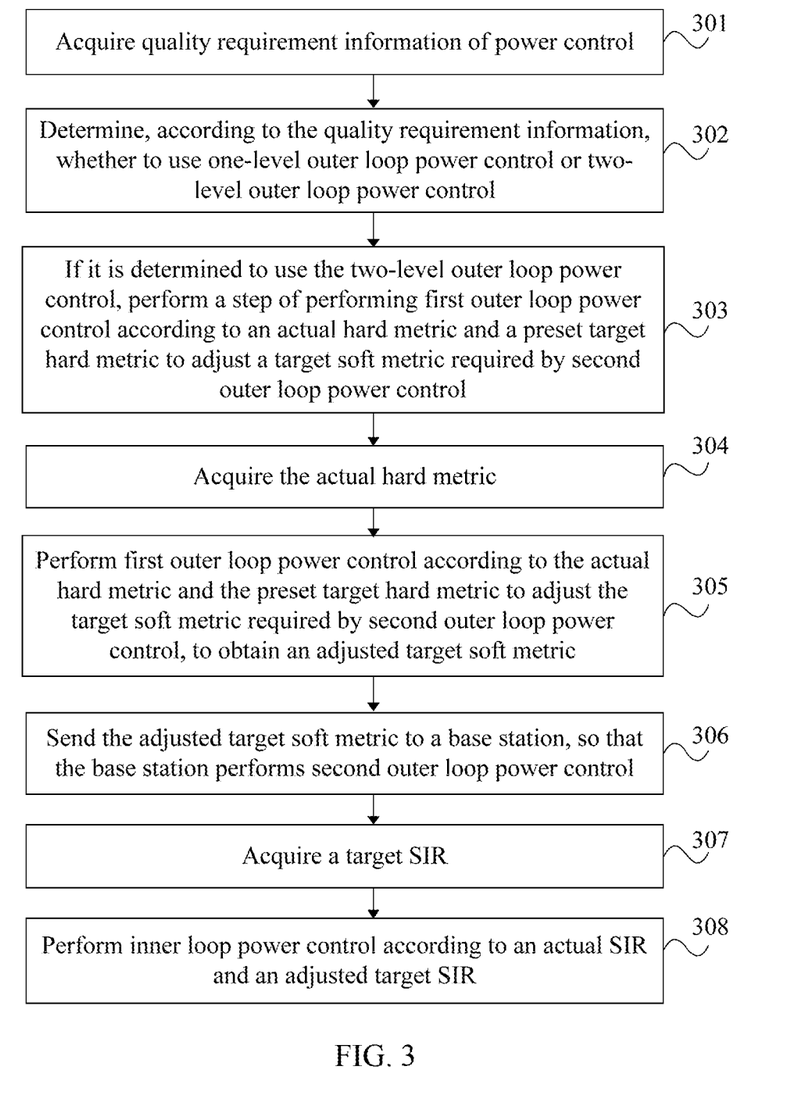
FIG. 3 is a schematic flowchart of Embodiment 3 of a power control method according to the present application.

FIG. 3 is a schematic flowchart of Embodiment 3 of a power control method according to the present application. As shown in FIG. 3, the method in this embodiment includes:

S301: Acquire quality requirement information of power control.

S302: Determine, according to the quality requirement information, whether to use one-level outer loop power control or two-level outer loop power control.

Specifically, the one-level outer loop power control adjusts, according to an actual soft metric and a target soft metric, an SIR required by inner loop power control.

The two-level outer loop power control additionally performs, on a basis of one-level outer loop power control, first outer loop power control according to an actual hard metric and a preset target hard metric to adjust a target soft metric required by second outer loop power control.

When the quality requirement information requires high quality, the two-level outer loop power control is used, and when the quality requirement information requires low quality, the one-level outer loop power control is used.

S303: If it is determined to use the two-level outer loop power control, perform a step of performing first outer loop power control according to an actual hard metric and a preset target hard metric to adjust a target soft metric required by second outer loop power control.

S301 to S303 are optional steps, that is, the quality requirement information may not be necessarily determined, and steps after S303 may be directly performed.

S304: Acquire the actual hard metric.

S305: Perform first outer loop power control according to the actual hard metric and the preset target hard metric to adjust the target soft metric required by second outer loop power control, to obtain an adjusted target soft metric.

In a feasible implementation manner, the step includes: if a magnitude of the target soft metric is inversely proportional to a status of target quality, determining, by means of comparison, whether the actual hard metric is greater than the preset target hard metric; and if yes, decreasing the target soft metric; or if no, increasing the target soft metric.

In this step, an example in which the hard metric is a BLER, and the soft metric is a BER is used.

Specifically, if the actual hard metric is greater than the preset target hard metric, the target soft metric is decreased by using a first adjustment value, and may be decreased according to the following formulas:

$$\text{Step\_down} = (\text{BLER\_est} - \text{BLER\_target}) \times \text{Step\_size},$$

$$\text{BER\_target}(n+1) = \text{BER\_target}(n) - \text{Step\_down},$$

where Step_down is the first adjustment value, and BER_target(n) is a target BER in the $n^{th}$ adjustment period; BER_target(n+1) is a target BER in the $(n+1)^{th}$ adjustment period, that is, an adjusted target BER; BLER_target is a target BLER (target receive quality) of a current call, and BLER_est is an estimated BLER (actual receive quality) of the current call; Step_size is a set adjustment step of the first outer loop power control and is typically set to 0.5 to 1.

If the actual hard metric is less than or equal to the preset target hard metric, the target soft metric is increased by using a second adjustment value, and may be increased according to the following formulas:

$$\text{Step\_up} = \text{BLER\_target} \times \text{Step\_size},$$

$$\text{BER\_target}(n+1) = \text{BER\_target}(n) + \text{Step\_up},$$

where Step_up is the second adjustment value, and BER_target(n) is a target BER in the $n^{th}$ adjustment period; BER_target(n+1) is a target BER in the $(n+1)^{th}$ adjustment period, that is, an adjusted target BER; BLER_target is a target BLER (target receive quality) of a current call, and BLER_est is an estimated BLER (actual receive quality) of the current call; Step_size is a set adjustment step of the first outer loop power control and is typically set to 0.5 to 1.

In another feasible implementation manner, if a magnitude of the target soft metric is proportional to a status of target quality, for example, the soft metric is soft information of a Turbo decoder, it is determined, by means of comparison, whether the actual hard metric is greater than the preset target hard metric, and if yes, the target soft metric is increased, or if no, the target soft metric is decreased. Specific steps of increasing and decreasing are similar to those of a BER, and details are not described herein again.

In an example of this step, the soft metric is merely a BER and soft information of a Turbo decoder, but the soft metric may be another soft metric, such as soft information of a Viterbi decoder, a signal-to-noise ratio of received information, or an Euclidean distance between received information and coding information, which is not limited in the present application. Formulas used are similar to the formulas for adjusting a BER, and details are not described herein again.

In an actual application, because of problems such as that a soft metric fluctuates extremely wildly or slightly, or that a soft metric has a narrow range of changing with a signal-to-noise ratio, specific transformation processing, for example, one or a combination of filtering processing, logarithmic processing, and fuzzy processing, is generally performed on the soft metric to extend an range of the soft metric.

If the target soft metric is a target soft metric obtained after transformation processing, accordingly, same transformation processing may also be performed on the first adjustment value or the second adjustment value required for adjusting the target soft metric, and the base station also performs same transformation processing on the actual soft metric.

If the actual soft metric is an actual soft metric obtained after transformation processing, accordingly, the RNC performs transformation processing same as that of the actual soft metric on the adjusted target soft metric, to obtain the target soft metric obtained after transformation processing.

In this step, first outer loop power control is performed according to the actual hard metric and the preset target hard metric to adjust the target soft metric required by second outer loop power control, to obtain the adjusted target soft metric. Therefore, this ensures that mapping between the adjusted target soft metric and the preset target hard metric is more accurate.

S306: Send the adjusted target soft metric to a base station, so that the base station performs the second outer loop power control.

Specifically, the second outer loop power control adjusts a target SIR according to the actual soft metric and the adjusted target soft metric.

In this step, an example in which the soft metric is a BER is used. The target SIR may be adjusted according to the following formulas: $\text{DeltaSIR\_Target} = \text{Step\_size} \times (a \times \text{BER\_ERR} + (1-a) \times \text{DeltaBER\_ERR}),$ $$\text{SIR\_target}(n+1) = \text{SIR\_target}(n) + \text{DeltaSIR\_Target},$$

where DeltaSIR_Target is an adjustment value, Step_size is an adjustment step of the second outer loop power control and is typically configured to be 0.1 to 0.5; a indicates a weight value and is typically configured to be 0.5 to 0.9; BER_ERR indicates a difference between an actual BER value and a target BER value; DeltaBER_ERR indicates a change value of BER_ERR in consecutive speech frames. SIR_target(n) indicates a target SIR in the $n^{th}$ adjustment period, and SIR_target(n+1) indicates a target SIR in the $(n+1)^{th}$ adjustment period. The adjustment step Step_size of the second outer loop power control may be set according to an absolute value of BER_ERR. When the absolute value of BER_ERR is larger, Step_size is set to be larger, and when the absolute value of BER_ERR is smaller, Step_size is set to be smaller.

Second outer loop power control in S306 is performed by the base station. Optionally, equivalent to S306, second outer loop power control may also be performed by the RNC, and a specific step is as follow:

Second outer loop power control is performed according to the actual soft metric sent by the base station and the adjusted target soft metric, to obtain the adjusted target SIR, and the adjusted target SIR is sent to the base station. A method for performing second outer loop power control by the RNC is similar to a method for performing second outer loop power control by the base station, and details are not described herein again.

In this embodiment, steps S301-S306 are performed by the RNC, and S307-S308 are performed by the base station.

S307: Acquire a target SIR.

In a feasible implementation manner, before the target SIR is acquired, sending the actual soft metric to the RNC is further included. The target SIR sent by the RNC is received, where the target SIR is the adjusted target SIR obtained by performing second outer loop power control by the RNC according to the actual soft metric and the adjusted target soft metric that is obtained by means of first outer loop power control.

In another feasible implementation manner, the target soft metric sent by the RNC is received, and the target soft metric is the adjusted target soft metric obtained by performing first outer loop power control by the RNC according to the actual hard metric and the preset target hard metric, and then, second outer loop power control is performed according to the actual soft metric and the adjusted target soft metric to obtain the adjusted target SIR.

Regardless of whether second outer loop power control is performed by the RNC or the base station, a specific method of second outer loop power control is the same as that in S306, and details are not described herein again.

S308: Perform inner loop power control according to an actual SIR and an adjusted target SIR.

Specifically, the inner loop power control performs transmit power control on a UE according to the actual SIR and the adjusted target SIR. When the actual SIR is greater than the adjusted target SIR, power control indication information for reducing transmit power is sent to the UE, so that the UE reduces transmit power to reduce interference to a system. When the actual SIR is less than or equal to the adjusted target SIR, power control indication information for increasing transmit power is sent to the UE, so that the UE increases transmit power to improve quality of a received signal.

In this embodiment, first outer loop power control is performed according to an actual hard metric and a preset target hard metric to adjust a target soft metric required by second outer loop power control, to obtain an adjusted target soft metric. Therefore, this ensures that mapping between the adjusted target soft metric and the preset target hard metric is more accurate, that is, this ensures that when the adjusted target soft metric is converged, the target hard metric can be correctly converged to achieve target quality required by a system. In addition, because the second outer loop power control adjusts a target SIR according to an actual soft metric and the adjusted target soft metric, this ensures that the SIR can be increased and decreased in a balanced manner in a convergence cycle, and a convergence speed is fast.

Figure 4:
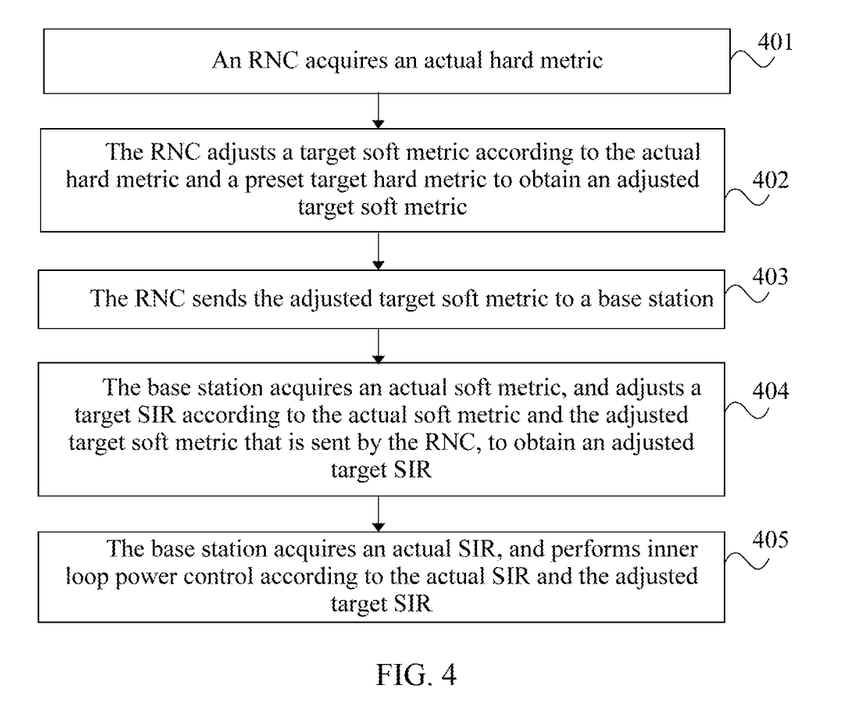
FIG. 4 is a schematic flowchart of Embodiment 4 of a power control method according to the present application.
Figure 5:
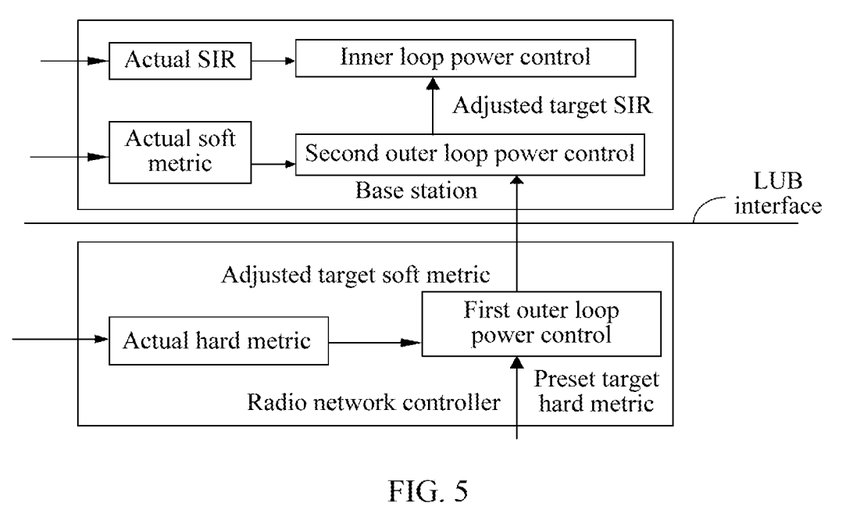
FIG. 5 is a schematic structural diagram corresponding to the embodiment of the power control method in FIG. 4.

FIG. 4 is a schematic flowchart of Embodiment 4 of a power control method according to the present application, and FIG. 5 is a schematic structural diagram corresponding to the embodiment of the power control method in FIG. 4. As shown in FIG. 4, the method in this embodiment includes:

S401: An RNC acquires an actual hard metric.

S402: The RNC adjusts a target soft metric according to the actual hard metric and a preset target hard metric to obtain an adjusted target soft metric.

S403: The RNC sends the adjusted target soft metric to a base station.

S404: The base station acquires an actual soft metric, and adjusts a target SIR according to the actual soft metric and the adjusted target soft metric that is sent by the RNC, to obtain an adjusted target SIR.

S405: The base station acquires an actual SIR, and performs inner loop power control according to the actual SIR and the adjusted target SIR.

The steps in this embodiment are similar to the implementation manners and the technical effects of the embodiment shown in FIG. 3, and details are not described herein again.

Figure 6:
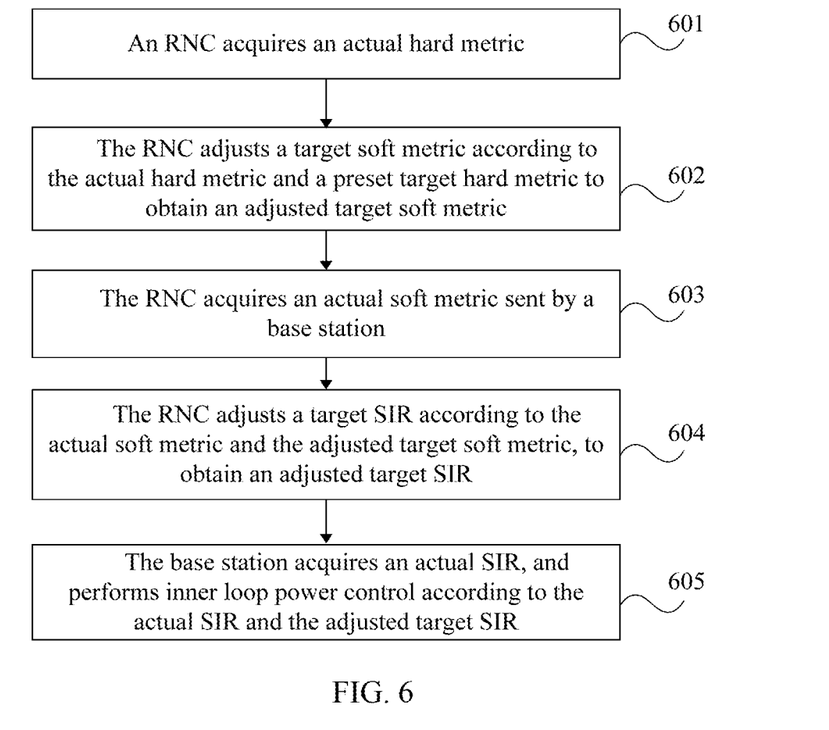
FIG. 6 is a schematic flowchart of Embodiment 5 of a power control method according to the present application.
Figure 7:
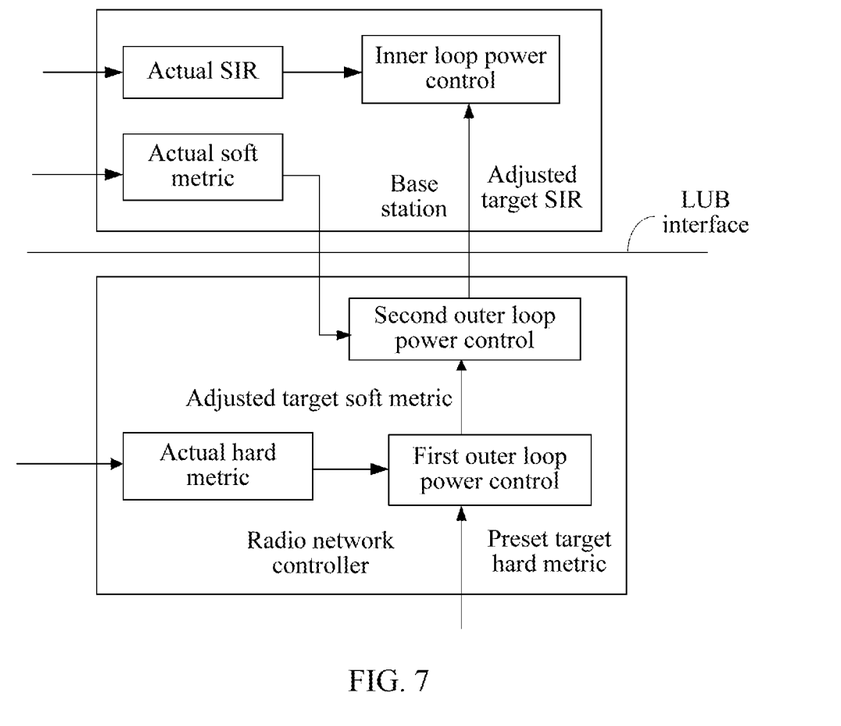
FIG. 7 is a schematic structural diagram corresponding to the embodiment of the power control method in FIG. 6.

FIG. 6 is a schematic flowchart of Embodiment 5 of a power control method according to the present application, and FIG. 7 is a schematic structural diagram corresponding to the embodiment of the power control method in FIG. 6. A difference between the embodiment shown in FIG. 6 and the embodiment shown in FIG. 4 is that: in the embodiment shown in FIG. 4, it is a base station that adjusts a target SIR according to an actual soft metric and an adjusted target soft metric that is sent by an RNC, to obtain an adjusted target SIR; in the embodiment shown in FIG. 6, it is an RNC that adjusts a target SIR according to an actual soft metric sent by a base station and an adjusted target soft metric, to obtain an adjusted target SIR. As shown in FIG. 6, the method in this embodiment includes:

S601: The RNC acquires an actual hard metric.

S602: The RNC adjusts a target soft metric according to the actual hard metric and a preset target hard metric to obtain the adjusted target soft metric.

S603: The RNC acquires the actual soft metric sent by the base station.

S604: The RNC adjusts the target SIR according to the actual soft metric and the adjusted target soft metric, to obtain the adjusted target SIR.

S605: The base station acquires an actual SIR, and performs inner loop power control according to the actual SIR and the adjusted target SIR.

The steps in this embodiment are similar to the implementation manners and the technical effects of the embodiment shown in FIG. 3, and details are not described herein again.

Figure 8:
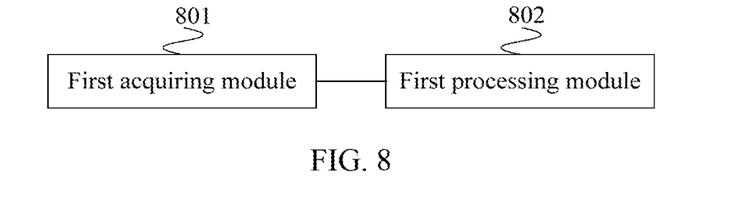
FIG. 8 is a schematic structural diagram of Embodiment 1 of a power control apparatus according to the present application.

FIG. 8 is a schematic structural diagram of Embodiment 1 of a power control apparatus according to the present application, and the apparatus in this embodiment may be integrated into an RNC. As shown in FIG. 8, the apparatus in this embodiment includes a first acquiring module 801 and a first processing module 802, where the first acquiring module 801 is configured to acquire an actual hard metric; and the first processing module 802 is configured to perform first outer loop power control according to the actual hard metric and a preset target hard metric to adjust a target soft metric required by second outer loop power control, to obtain an adjusted target soft metric, where the second outer loop power control adjusts a target signal-to-interference ratio SIR according to an actual soft metric and the adjusted target soft metric.

The apparatus in this embodiment may be configured to perform the technical solution in the method embodiment shown in FIG. 1, and implementation principles and technical effects of the apparatus and the technical solution are similar and details are not described herein again.

In the foregoing embodiment, the first processing module 802 is further configured to: after performing first outer loop power control according to the actual hard metric and the preset target hard metric to adjust the target soft metric required by second outer loop power control, to obtain the adjusted target soft metric, send the adjusted target soft metric to a base station, so that the base station performs second outer loop power control; or perform second outer loop power control according to the actual soft metric sent by a base station and the adjusted target soft metric, to obtain an adjusted target SIR; and send the adjusted target SIR to the base station.

In the foregoing embodiment, if a magnitude of the target soft metric is inversely proportional to a status of target quality, when performing first outer loop power control according to the actual hard metric and the preset target hard metric to adjust the target soft metric required by second outer loop power control, the first processing module 802 is specifically configured to: determine, by means of comparison, whether the actual hard metric is greater than the preset target hard metric; and if yes, decrease the target soft metric; or if no, increase the target soft metric; or if a magnitude of the target soft metric is proportional to a status of target quality, when performing first outer loop power control according to the actual hard metric and the preset target hard metric to adjust the target soft metric required by second outer loop power control, the first processing module 802 is specifically configured to: determine, by means of comparison, whether the actual hard metric is greater than the preset target hard metric; and if yes, increase the target soft metric; or if no, decrease the target soft metric.

In the foregoing embodiment, when decreasing the target soft metric, the first processing module 802 is specifically configured to decrease the target soft metric by using a first adjustment value; or when increasing the target soft metric, the first processing module 802 is specifically configured to increase the target soft metric by using a second adjustment value.

In the foregoing embodiment, the first processing module 802 is further configured to: after obtaining the adjusted target soft metric, perform transformation processing on the target soft metric to obtain a target soft metric obtained after transformation processing, where: accordingly, the actual soft metric is a soft metric obtained after transformation processing.

In the foregoing embodiment, the transformation processing includes one or a combination of the following processing: filtering processing, logarithmic processing, and fuzzy processing.

In the foregoing embodiment, the first processing module 802 is further configured to: before performing first outer loop power control according to the actual hard metric and the preset target hard metric to adjust the target soft metric required by second outer loop power control, acquire quality requirement information of power control; determine, according to the quality requirement information, whether to use one-level outer loop power control or two-level outer loop power control; and if it is determined to use two-level outer loop power control, perform the step of the performing first outer loop power control according to the actual hard metric and a preset target hard metric to adjust a target soft metric required by second outer loop power control.

In the foregoing embodiment, the hard metric is a block error rate BLER, and/or the soft metric is a bit error rate BER.

The apparatus in this embodiment may be configured to perform the technical solution in the method embodiment shown in FIG. 3, and implementation principles and technical effects of the apparatus and the technical solution are similar and details are not described herein again.

Figure 9:
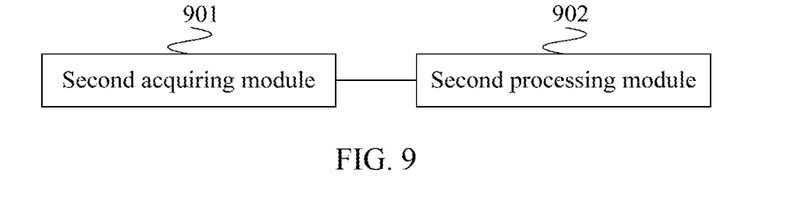
FIG. 9 is a schematic structural diagram of Embodiment 2 of a power control apparatus according to the present application.

FIG. 9 is a schematic structural diagram of Embodiment 2 of a power control apparatus according to the present application, and the apparatus in this embodiment may be integrated into a base station. As shown in FIG. 9, the apparatus in this embodiment includes a second acquiring module 901 and a second processing module 902, where the second acquiring module 901 is configured to acquire a target SIR, where the target SIR is an adjusted target SIR obtained by performing second outer loop power control according to an actual soft metric and an adjusted target soft metric that is obtained by means of first outer loop power control, and the first outer loop power control adjusts a target soft metric according to an actual hard metric and a preset target hard metric; and the second processing module 902 is configured to perform inner loop power control according to an actual SIR and the adjusted target SIR.

The apparatus in this embodiment may be configured to perform the technical solution in the method embodiment shown in FIG. 2, and implementation principles and technical effects of the apparatus and the technical solution are similar and details are not described herein again.

Figure 10:
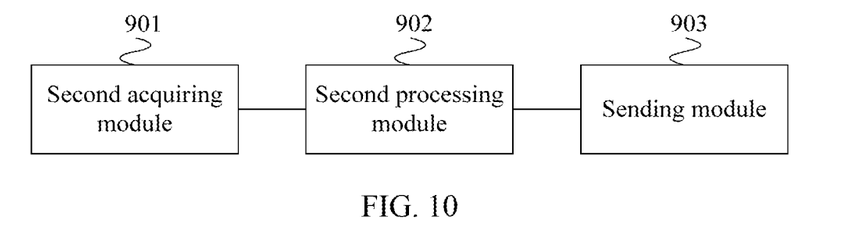
FIG. 10 is a schematic structural diagram of Embodiment 3 of a power control apparatus according to the present application.

FIG. 10 is a schematic structural diagram of Embodiment 3 of a power control apparatus according to the present application. Further, based on the embodiment shown in FIG. 9, the apparatus in FIG. 10 further includes a sending module 903. As shown in FIG. 10, the sending module 903 is configured to: before the target SIR is acquired, send the actual soft metric to an RNC; and when acquiring the target SIR, the second acquiring module 901 is specifically configured to receive the target SIR sent by the RNC, where the target SIR is the adjusted target SIR obtained by performing second outer loop power control by the RNC according to the actual soft metric and the adjusted target soft metric that is obtained by means of first outer loop power control.

In the embodiment shown in FIG. 9, when acquiring the target SIR, the second acquiring module 901 is specifically configured to: receive the target soft metric sent by the RNC, where the target soft metric is the adjusted target soft metric obtained by performing first outer loop power control by the RNC according to the actual hard metric and the preset target hard metric; and perform second outer loop power control according to the actual soft metric and the adjusted target soft metric to obtain the adjusted target SIR.

In the foregoing embodiments, the actual soft metric is an actual soft metric obtained after transformation processing, and the target soft metric is a target soft metric obtained after transformation processing.

In the foregoing embodiment, the transformation processing includes one or a combination of the following processing:

filtering processing, logarithmic processing, and fuzzy processing.

In the foregoing embodiments, the soft metric is a bit error rate BER.

The apparatus in this embodiment may be configured to perform the technical solution in the method embodiment shown in FIG. 3, and implementation principles and technical effects of the apparatus and the technical solution are similar and details are not described herein again.

Figure 11:
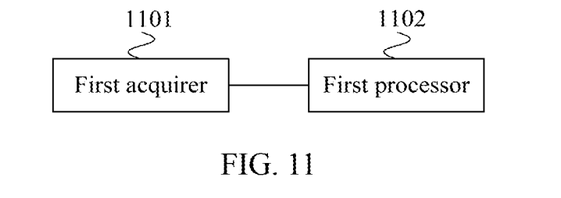
FIG. 11 is a schematic structural diagram of Embodiment 4 of a power control apparatus according to the present application.

FIG. 11 is a schematic structural diagram of Embodiment 4 of a power control apparatus according to the present application, and the apparatus in this embodiment may be integrated into an RNC. As shown in FIG. 11, the apparatus in this embodiment includes a first acquirer 1101 and a first processor 1102, where the first acquirer 1101 is configured to acquire an actual hard metric; and the first processor 1102 is configured to perform first outer loop power control according to the actual hard metric and a preset target hard metric to adjust a target soft metric required by second outer loop power control, to obtain an adjusted target soft metric, where the second outer loop power control adjusts a target signal-to-interference ratio SIR according to an actual soft metric and the adjusted target soft metric.

The apparatus in this embodiment may be configured to perform the technical solution in the method embodiment shown in FIG. 1, and implementation principles and technical effects of the apparatus and the technical solution are similar and details are not described herein again.

In the foregoing embodiment, the first processor 1102 is further configured to: after performing first outer loop power control according to the actual hard metric and the preset target hard metric to adjust the target soft metric required by second outer loop power control, to obtain the adjusted target soft metric, send the adjusted target soft metric to a base station, so that the base station performs second outer loop power control; or perform second outer loop power control according to the actual soft metric sent by a base station and the adjusted target soft metric, to obtain an adjusted target SIR; and send the adjusted target SIR to the base station.

In the foregoing embodiment, if a magnitude of the target soft metric is inversely proportional to a status of target quality, when performing first outer loop power control according to the actual hard metric and the preset target hard metric to adjust the target soft metric required by second outer loop power control, the first processor 1102 is specifically configured to: determine, by means of comparison, whether the actual hard metric is greater than the preset target hard metric; and if yes, decrease the target soft metric; or if no, increase the target soft metric; or if a magnitude of the target soft metric is proportional to a status of target quality, when performing first outer loop power control according to the actual hard metric and the preset target hard metric to adjust the target soft metric required by second outer loop power control, the first processor 1102 is specifically configured to: determine, by means of comparison, whether the actual hard metric is greater than the preset target hard metric; and if yes, increase the target soft metric; or if no, decrease the target soft metric.

In the foregoing embodiment, when decreasing the target soft metric, the first processor 1102 is specifically configured to decrease the target soft metric by using a first adjustment value; or when increasing the target soft metric, the first processor 1102 is specifically configured to increase the target soft metric by using a second adjustment value.

In the foregoing embodiment, the first processor 1102 is further configured to: after obtaining the adjusted target soft metric, perform transformation processing on the target soft metric to obtain a target soft metric obtained after transformation processing, where: accordingly, the actual soft metric is a soft metric obtained after transformation processing.

In the foregoing embodiment, the transformation processing includes one or a combination of the following processing: filtering processing, logarithmic processing, and fuzzy processing.

In the foregoing embodiment, the first processor 1102 is further configured to: before performing first outer loop power control according to the actual hard metric and the preset target hard metric to adjust the target soft metric required by second outer loop power control, acquire quality requirement information of power control; determine, according to the quality requirement information, whether to use one-level outer loop power control or two-level outer loop power control; and if it is determined to use two-level outer loop power control, perform the step of the performing first outer loop power control according to the actual hard metric and a preset target hard metric to adjust a target soft metric required by second outer loop power control.

In the foregoing embodiment, the hard metric is a block error rate BLER, and/or the soft metric is a bit error rate BER.

The apparatus in this embodiment may be configured to perform the technical solution in the method embodiment shown in FIG. 3, and implementation principles and technical effects of the apparatus and the technical solution are similar and details are not described herein again.

Figure 12:
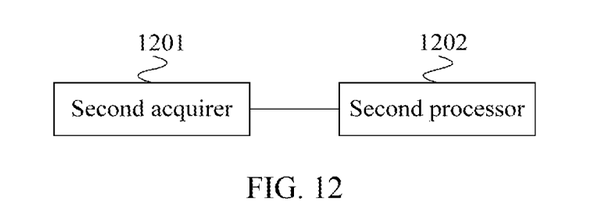
FIG. 12 is a schematic structural diagram of Embodiment 5 of a power control apparatus according to the present application.

FIG. 12 is a schematic structural diagram of Embodiment 5 of a power control apparatus according to the present application, and the apparatus in this embodiment may be integrated into a base station. As shown in FIG. 12, the apparatus in this embodiment includes a second acquirer 1201 and a second processor 1202, where the second acquirer 1201 is configured to acquire a target SIR, where the target SIR is an adjusted target SIR obtained by performing second outer loop power control according to an actual soft metric and an adjusted target soft metric that is obtained by means of first outer loop power control, and the first outer loop power control adjusts a target soft metric according to an actual hard metric and a preset target hard metric; and the second processor 1202 is configured to perform inner loop power control according to an actual SIR and the adjusted target SIR.

The apparatus in this embodiment may be configured to perform the technical solution in the method embodiment shown in FIG. 2, and implementation principles and technical effects of the apparatus and the technical solution are similar and details are not described herein again.

Figure 13:
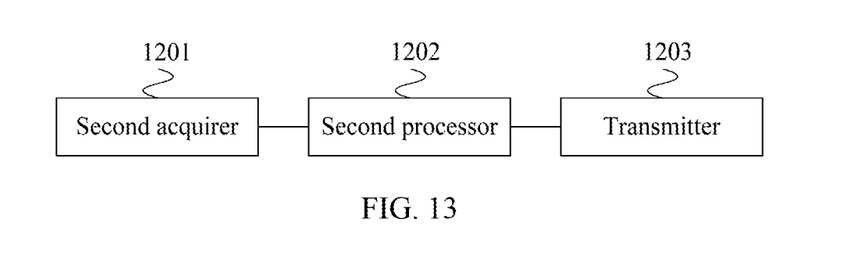
FIG. 13 is a schematic structural diagram of Embodiment 6 of a power control apparatus according to the present application.

FIG. 13 is a schematic structural diagram of Embodiment 6 of a power control apparatus according to the present application. Further, based on the embodiment shown in FIG. 12, the apparatus in FIG. 13 further includes a transmitter 1203. As shown in FIG. 13, the transmitter 1203 is configured to: before the target is acquired, send the actual soft metric to an RNC; and when acquiring the target SIR, the second acquirer 1201 is specifically configured to receive the target SIR sent by the RNC, where the target SIR is the adjusted target SIR obtained by performing second outer loop power control by the RNC according to the actual soft metric and the adjusted target soft metric that is obtained by means of first outer loop power control.

In the embodiment shown in FIG. 12, when acquiring the target SIR, the second acquirer 1201 is specifically configured to: receive the target soft metric sent by the RNC, where the target soft metric is the adjusted target soft metric obtained by performing first outer loop power control by the RNC according to the actual hard metric and the preset target hard metric; and perform second outer loop power control according to the actual soft metric and the adjusted target soft metric to obtain the adjusted target SIR.

In the foregoing embodiments, the actual soft metric is an actual soft metric obtained after transformation processing, and the target soft metric is a target soft metric obtained after transformation processing.

In the foregoing embodiment, the transformation processing includes one or a combination of the following processing:

filtering processing, logarithmic processing, and fuzzy processing.

In the foregoing embodiments, the soft metric is a bit error rate BER.

The apparatus in this embodiment may be configured to perform the technical solution in the method embodiment shown in FIG. 3, and implementation principles and technical effects of the apparatus and the technical solution are similar and details are not described herein again.

Figure 14:
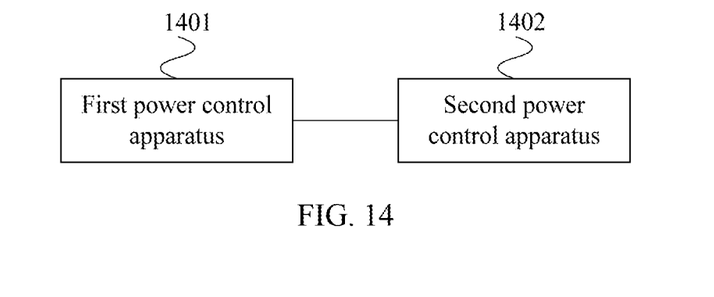
FIG. 14 is a schematic structural diagram of Embodiment 1 of a power control system according to the present application.

FIG. 14 is a schematic structural diagram of Embodiment 1 of a power control system according to the present application. As shown in FIG. 14, the system in this embodiment includes the first power control apparatus 1401 shown in FIG. 8, and the second power control apparatus 1402 shown in FIG. 9, where the first power control apparatus 1401 may be integrated into an RNC, and the second power control apparatus 1402 may be integrated into a base station. For a specific structure of each power control apparatus in the embodiment of the power control system, reference may be made to the foregoing apparatus embodiments, and details are not described herein again. For a method related to the embodiment of the power control system, reference may be made to procedures of the foregoing method embodiments, and details are not described herein again. The apparatuses in this embodiment are wirelessly connected to each other.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present application.

What is claimed is:

1. A power control method comprising:
   acquiring an actual hard metric; and
   performing first outer loop power control according to the actual hard metric and a preset target hard metric to adjust a target soft metric, to obtain an adjusted target soft metric, wherein a second outer loop power control adjusts a target signal-to-interference ratio (SIR) according to an actual soft metric and the adjusted target soft metric;
   wherein when a magnitude of the target soft metric is inversely proportional to a status of target quality, performing the first outer loop power control comprises:
      determining, by a comparison, whether the actual hard metric is greater than the preset target hard metric; and
      when the actual hard metric is greater than the preset target hard metric, decreasing the target soft metric, or when the actual hard metric is not greater than the preset target hard metric, increasing the target soft metric; or
   wherein when a magnitude of the target soft metric is directly proportional to a status of target quality, performing the first outer loop power control comprises:
      determining, by a comparison, whether the actual hard metric is greater than the preset target hard metric; and
      when the actual hard metric is greater than the preset target hard metric, increasing the target soft metric, or when the actual hard metric is not greater than the preset target hard metric, decreasing the target soft metric.

2. The method according to claim 1, wherein after the performing the first outer loop power control, the method further comprises:
   sending the adjusted target soft metric to a base station, so that the base station performs the second outer loop power control; or
   performing the second outer loop power control according to the actual soft metric sent by a base station and the adjusted target soft metric, to obtain an adjusted target SIR; and sending the adjusted target SIR to the base station.

3. The method according to claim 1,
   wherein decreasing the target soft metric comprises decreasing the target soft metric by using a first adjustment value; or
   wherein increasing the target soft metric comprises increasing the target soft metric using a second adjustment value.

4. The method according to claim 1, wherein after the adjusted target soft metric is obtained, the method further comprises:
   performing transformation processing on the target soft metric to obtain a target soft metric, wherein the actual soft metric is the target soft metric obtained after the transformation processing.

5. The method according to claim 4, wherein the transformation processing comprises one or a combination of the following:
   filtering processing, logarithmic processing, and fuzzy processing.

6. The method according to claim 1, wherein before performing the first outer loop power control, the method further comprises:
   acquiring quality requirement information of power control;
   determining, according to the quality requirement information, whether to use one-level outer loop power control or two-level outer loop power control; and
   if it is determined to use two-level outer loop power control, performing the first outer loop power control according to the actual hard metric and the preset target hard metric to adjust the target soft metric required by the second outer loop power control.

7. A power control apparatus comprising:
   a receiver, configured to acquire an actual hard metric;
   a processor; and
   a memory storing a program to be executed by the processor, the program comprising instructions for performing first outer loop power control according to the actual hard metric and a preset target hard metric to adjust a target soft metric, to obtain an adjusted target soft metric, wherein a second outer loop power control adjusts a target signal-to-interference ratio (SIR) according to an actual soft metric and the adjusted target soft metric;
   wherein the instructions for performing the first outer loop power control comprise instructions for:
      when a magnitude of the target soft metric is inversely proportional to a status of target quality:
         determining, by a comparison, whether the actual hard metric is greater than the preset target hard metric; and
         when the actual hard metric is greater than the preset target hard metric, decreasing the target soft metric, or when the actual hard metric is not greater than the preset target hard metric, increase the target soft metric; or
      when a magnitude of the target soft metric is directly proportional to a status of target quality:
         determining, by a comparison, whether the actual hard metric is greater than the preset target hard metric; and
         when the actual hard metric is greater than the preset target hard metric, increasing the target soft metric, or when the actual hard metric is not greater than the preset target hard metric, decreasing the target soft metric.

8. The apparatus according to claim 7, wherein the program includes further instructions for:
   sending the adjusted target soft metric to a base station, so that the base station performs the second outer loop power control; or
   performing the second outer loop power control according to the actual soft metric sent by a base station and the adjusted target soft metric so as to obtain an adjusted target SIR, and sending the adjusted target SIR to the base station.

9. The apparatus according to claim 7, wherein the program includes further instructions for:
   decreasing the target soft metric using a first adjustment value; or
   increasing the target soft metric using a second adjustment value.

10. The apparatus according to claim 7, the program includes further instructions for: after obtaining the adjusted target soft metric, performing transformation processing on the target soft metric to obtain a target soft metric, wherein the actual soft metric is the target soft metric obtained after the transformation processing.

11. The apparatus according to claim 10, wherein the transformation processing comprises one or a combination of the following:
filtering processing, logarithmic processing, and fuzzy processing.

12. The apparatus according to claim 7, wherein the program includes further instructions for:
before performing the first outer loop power control according to the actual hard metric and the preset target hard metric to adjust the target soft metric required by second outer loop power control, acquiring quality requirement information of power control;
determining, according to the quality requirement information, whether to use one-level outer loop power control or two-level outer loop power control; and
if it is determined to use two-level outer loop power control, performing the step of the performing first outer loop power control according to the actual hard metric and a preset target hard metric to adjust a target soft metric required by second outer loop power control.

13. A power control apparatus comprising:
a receiver, configured to acquire a target signal-to-interference ratio (SIR), wherein the target SIR is an adjusted target SIR obtained by performing a second outer loop power control according to an actual soft metric and an adjusted target soft metric that is obtained using a first outer loop power control, and the first outer loop power control adjusts a target soft metric according to an actual hard metric and a preset target hard metric;
a processor; and
a memory storing a program to be executed by the processor, the program comprising instructions for:
performing an inner loop power control according to an actual SIR and the adjusted target SIR;
wherein the receiver is configured to: receive the target soft metric sent by a radio network controller (RNC), wherein the target soft metric is the adjusted target soft metric obtained by performing the first outer loop power control by the RNC according to the actual hard metric and the preset target hard metric; and wherein the program comprises instructions for performing the second outer loop power control according to the actual soft metric and the adjusted target soft metric to obtain the adjusted target SIR.

14. The apparatus according to claim 13, wherein the actual soft metric is an actual soft metric obtained after transformation processing, and the target soft metric is a target soft metric obtained after the transformation processing.

15. The apparatus according to claim 14, wherein the transformation processing comprises one or a combination of the following:
filtering processing, logarithmic processing, and fuzzy processing.

16. The apparatus according to claim 13, wherein the soft metric is a bit error rate (BER).

* * * * *